Mervil Hallead
INVENTOR.

BY Edwin P. Corker
ATTORNEYS.

Feb. 16, 1932.        M. HALLEAD        1,845,146
AUTOMATIC SCALE
Filed Jan. 27, 1927      2 Sheets-Sheet 2

Mervil Hallead
INVENTOR.

BY
ATTORNEYS.

Patented Feb. 16, 1932

1,845,146

UNITED STATES PATENT OFFICE

MERVIL HALLEAD, OF COLUMBUS, OHIO, ASSIGNOR TO THE EXACT WEIGHT SCALE COMPANY, OF COLUMBUS, OHIO, A CORPORATION OF OHIO

AUTOMATIC SCALE

Application filed January 27, 1927. Serial No. 163,959.

My invention relates to scales. It is particularly related to that type of scale wherein the weight placed upon or in the platform or pan of the scale, as the case may be, will automatically bring the scale beam to a balance at some point within the travel of the scale levels and wherein no manipulation of the compensating weight is required. However, it is not limited to this type of scale.

Springless automatic scales used previous to this time have, preferably, been of the pendulum weight and beam type which requires an almost perfect condition of level and delicate adjustments from time to time in order that they may give accurate measurement.

Furthermore, scales of the type mentioned above have used a balanced main lever, adjustable cams or variable moment arm pulleys and rapidly moving compensating weights. These last-named weights, preferably, took the form of a free swinging pendulum having one end attached to the adjustable cam or variable moment arm pulley.

One object of my invention is to provide a scale which will automatically adjust itself to maintain true weighing positions of the parts essential to the weighing action regardless of the position of level of the scale as a whole. In pursuance of this object, I have provided a means for offsetting and counteracting the moments of forces which arise, independently of the product being weighed whenever the weighing action occurs or whenever the scale as a whole is out of level. More specifically, I have provided a means connected to the scale beam for offering resistance to the movement of the beam away from its predetermined relative position of the framework by a mechanism that ensures that this resistance will be substantially equal to any moments of forces, excepting those exerted by the article being weighed, which tend to effect movement of said beam away from its predetermined relative position to said framework.

Another object of my invention is to provide a scale wherein the use of a balanced main lever is eliminated.

A further object of my invention is to provide a springless automatic scale wherein the cams or variable moment arm pulleys are self-adjusting.

A still further object of my invention is to provide a scale wherein the likelihood of error is reduced to a minimum.

Still another object of my invention is to provide a weighing device wherein no rapidly moving compensating weights are necessary.

Other and further objects of my invention will appear from the detailed description hereinafter set forth and the preferred embodiment of my invention is seen in the accompanying drawings wherein similar characters of reference designate corresponding parts and wherein Figure 1 is a perspective view of the preferred embodiment of my invention.

Figure 1:
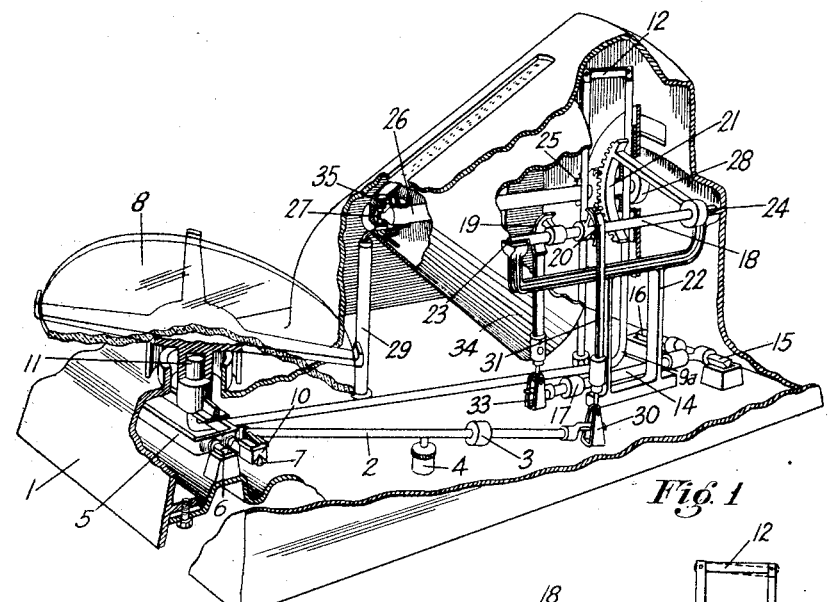

With reference to Figure 1 of the drawings, the numeral 1 represents a housing for my scale mechanism. It will be understood that the scale mechanism may be covered by any preferred form of housing and no claim is made to any specific form in this specification.

Figure 2:
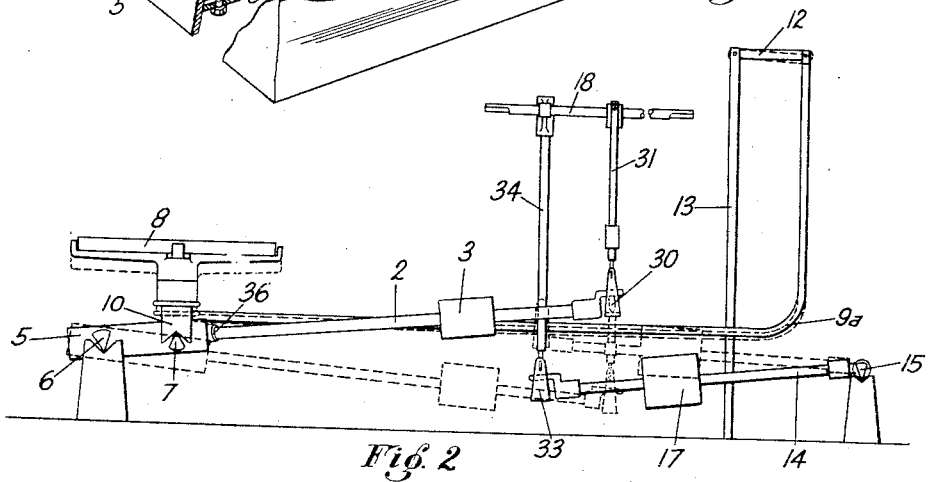
Figure 2 is a side view of the lever mechanism of my invention showing the relative movement of the levers from no load to full load position.
Figure 3:
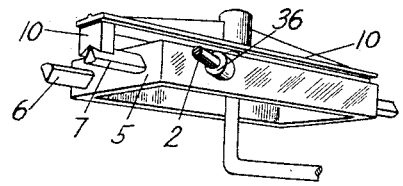
Figure 3 is a perspective view of the means for holding the weighing platform upright, the means for pivoting the weighing arm and the means for attaching the weighing arm.
Figure 4:
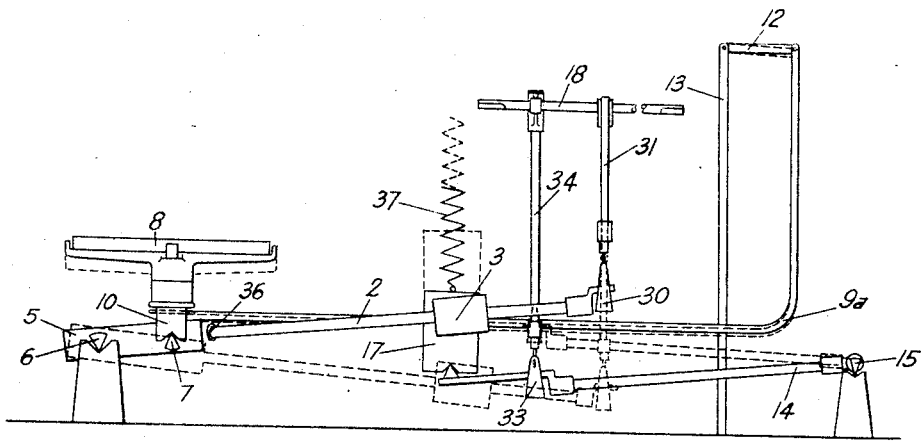
Figure 4 is a modification of the mechanism shown in Figure 2, in that the compensating weight is shown as being partially supported by a spring.

In the scale mechanism, I have provided a main lever 2 and equipped this main lever with an adjusting weight 3 and a dashpot 4. One end of the main lever 2 is rigidly attached to the beam 5, as at 36, (see Figures 2, 3 and 4) and the opposite end is supported by the saddle bracket 30, as shown in Figures 1, 2 and 4. The beam 5 is supported on a knife edge bearing 6 and carries the knife edge portion 7 of the bearing that supports the weight of the weighing platter or pan 8.

Figure 5:
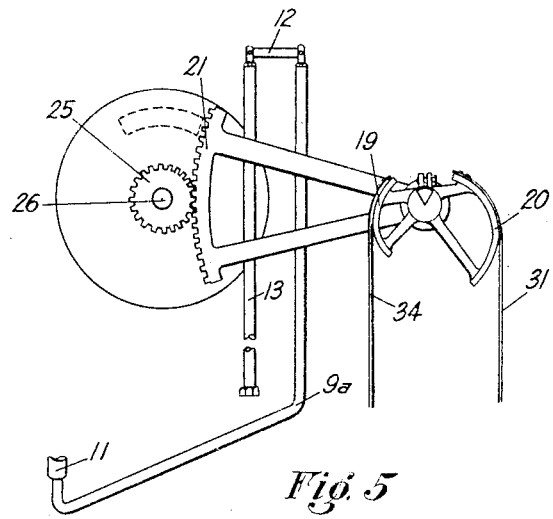
Figure 5 is a detail sectional view showing the cams or variable moment arm pulleys and the mechanism for moving the weight indicator.

A rod 9 for holding the platter or pan 8 in vertical position is rigidly attached to the casting 10 and is equipped with an extension 11 (see Figures 1 and 5) which extension is adapted to interfit with the platter or pan support, as shown in Figure 1. The opposite end of this rod 9 is bent upwardly, as at 9$^a$, and pivotally attached to a link 12 which is in turn pivoted to the upright support 13 forming a check-rod connection.

I have also provided a weight arm 14 having one end pivoted on the knife edge bearings 15 and 16 and have equipped this weight arm 14 with an adjusting weight 17. The opposite end of this weight arm 14 is supported in the stirrup bracket 33. Having the weight arm, which functions as the resisting element of the scale, constructed and arranged in the manner shown in Figure 1 of the drawings, is one of the main factors in providing a scale that will weigh in any condition of level although it is conceivable that other construction and arrangements may be used to attain this result.

A shaft 18, having the variable moment arm pulleys 19 and 20 and the gear sector 21 rigidly attached thereto, is mounted on the support 22 by means of the knife edge bearings 23 and 24 (see Figure 1). The variable moment arm pulleys have stirrup brackets 30 and 33 suspended therefrom by means of the straps or ribbons 31 and 34.

My scale mechanism is shown as being, preferably, adapted, although not limited, to use in a scale where the weight readings are shown on a conical indicator. The apex of such a conical indicator has an inwardly extending sleeve portion 35 which portion is riveted or otherwise secured to the shaft 26 of my mechanism. The shaft 26 is mounted in anti-friction bearings 27 and 28 held by the upright support 29 and a similar upright support (not shown). The shaft 26 has a pinion 25 mounted thereon which is adapted to mesh with the gear sector 21.

The operation of my scale mechanism will now be described in detail. A load of unknown weight is placed upon or in the platter or pan 8, such load of unknown weight exerting a downward off-center force upon the scale beam 5, which beam is fulcrumed on the knife edge bearing 6. The downward force acts on the main lever 2, such lever being rigidly attached to the beam 5, to move it downwardly.

Since one end of the lever arm 2 is supported in the stirrup bracket 30, and the stirrup-bracket 30 is supported by the cam or variable moment arm pulley through the medium of a strap or ribbon 31, the downward movement of the lever arm 2 will rotate the shaft 18 to which the cam or variable moment arm pulley 20 is rigidly attached.

The cam or variable moment arm pulley 19, having the stirrup-bracket 33 attached thereto by the strap or ribbon 34, is rigidly attached to the shaft 18 and oppositely disposed to the cam or variable moment arm pulley 20. This cam or variable moment arm pulley 19 supports one end of the pivoted weight arm 14 carrying the weight 17. Therefore, as the weight on the platter or pan 8 moves the shaft 18 in one direction, resistance is offered by the weight of the weight arm 14 as the weight arm 14 is lifted by the rotation of the shaft 18. When the scale mechanism is moved in one direction by a weight placed upon or in the platter or pan 8, the resistance offered by the weight arm 14 causes the scale mechanism to seek a position of equilibrium, or that point in the scale mechanism where the moment exerted in one direction by the load will be equaled by the moment exerted in the opposite direction by the weight of the lifted weight arm 14.

Any rotating motion of the shaft 18 rotates the shaft 26 and the conical indicator through the medium of the gear sector 21 and the pinion 25. The conical indicator has weight readings disposed about its outer surface and these weight readings are so graduated, with respect to the scale mechanism and an opening in the scale housing, that, when the scale mechanism reaches a position of equilibrium, the correct weight reading of the load upon or in the platter or pan 8 may be seen through the opening in the scale housing. A line is preferably provided in such openings by means of a taut wire or a cut on the glass opening to make possible ready reading of the calibrations on the conical surface.

The main lever 2 and the weight arm 14 are so placed that, when there is no load upon the platter or pan 8, the main lever 2 and the weight arm 14 lie in substantially parallel planes (see Figure 2) and the cams or variable moment arm pulleys 19 and 20 are so designed that this substantial parallelism is maintained throughout all movements of the main lever and weight arm 14 (shown by dotted lines in Figure 2). Therefore, it will be easily understood that the scale will give accurate measurement when in any condition of level.

Heretofore, the cam or variable moment arm pulley has been raised or lowered by means of adjusting weights and screws to bring the scale mechanism to the desired zero load position. In order to make the scale self-adjusting, I have provided two oppositely disposed cams or variable moment arm pulleys 19 and 20 rigidly attached to the same shaft 18. One cam or variable moment arm pulley supports the main lever or weighing arm and the other cam or variable moment arm pulley supports one end of the pivoted weight arm, which weight arm furnishes resistance to the main lever or weighing arm. Therefore, it will be obvious that the scale mechanism will automatically seek a position of equilibrium or, in other words, adjust itself to zero load position.

In Figure 4 of the drawings, I have shown a modification of my scale mechanism wherein the compensating weight 17 is pivoted adjacent the end of the weight arm 14, as shown in the figure, and is partially supported by a spring 37. The remainder of the scale mechanism functions in the same manner as the mechanism hereinbefore described so it will be seen that many variations may be made in the construction of the scale mechanism without departing from the spirit of my invention.

Clearly, it will be obvious, by referring to the previous description, that I have so constructed and arranged this scale mechanism that the use of a balanced main lever and rapidly moving compensating weight is eliminated. It, clearly, will also be obvious that I have provided a self-adjusting automatic scale, so designed that it will give accurate measurement in any condition of level and the likelihood of error will be reduced to a minimum.

In the specification and claims of this application, the term "weight arm" has been applied to the weight carrying member 14, although it will be readily apparent that such member may of itself be of sufficient weight to produce the normal functioning thereof without the addition of an auxiliary weight.

Having thus described my invention, what I claim is:

1. An automatic scale comprising a pivotally mounted beam, a pivotally mounted weight arm, a cam structure for operatively connecting said beam and said weight arm, the pivot of the beam being adjacent that end of the beam which is farthest removed from that end of the weight arm at which the pivot of said weight arm is mounted.

2. An automatic scale comprising a pivotally mounted beam and a pivotally mounted weight arm, the pivots of said beam and weight arm being spaced apart in the direction of length of said beam and weight arm and in such a direction that the movement of the free ends of said beam and weight arm still permits said beam and said weight arm to remain in parallel relation, and means for so connecting said beam and said weight arm that the movement of one is automatically compensated for by the movement of the other.

3. An automatic scale comprising a rotatable member, a pivotally mounted beam having its free end connected to one side of said member, a pivotally mounted weight arm having its free end connected to the other side of said member, the pivot of the beam being adjacent that end of the beam which is farthest removed from that end of the weight arm at which the pivot of said weight arm is mounted.

4. An automatic scale comprising a beam, a weight arm pivoted substantially in parallelism to said beam and means for substantially maintaining such parallelism when the scale is either in level or out of level.

5. An automatic scale comprising a rotatable indicator, pivotally mounted cams operatively connected together, a beam connected to one of said cams, a pivoted weight arm connected to another of said cams, the pivots of said beam and said weight arm and the connections being such that the moments of forces applied to the indicator by the beam will be the same as the moments of forces applied by the weight arm when the scale is out of level.

6. An automatic scale comprising pivoted cams operatively connected together, a beam connected to one of said cams, and a pivoted weight arm connected to another of said cams, said connections being such that movement of the scale out of level will cause the pivoted weight arm to prevent the beam from assuming new starting position.

7. An automatic scale comprising a rotatable member, connecting means on said member, a pivotally mounted beam having its free end connected to one side of said member, a pivotally mounted weight arm having its free end connected to the other side of said member, the pivot of said beam being at that end of the beam which is farthest removed from that end of said weight arm at which its pivot is located.

8. An automatic scale comprising a rotatable indicator, gearing for rotating said indicator, a shaft about which said gearing is rotatable, movement cams pivoted to said shaft, a scale beam connected to a moment cam on one side of said shaft and a pivoted weight arm connected to a moment cam on the opposite side of said shaft.

9. An automatic scale comprising a rotatable member, moment cams on opposite sides of said member, a scale beam, a flexible connection between the free end of said scale beam and one of said moment cams, a pivoted weight arm and a flexible connection between the free end of said weight arm and the other of said moment cams.

10. An automatic scale comprising a rotatable member, two moment cams on opposite sides of said member, a scale beam, a flexible connection between the free end of said scale beam and one of said moment cams, a pivoted weight arm and a flexible connection between the free end of said weight arm and the other of said moment cams, the pivots of said beam and weight arm being located at opposing ends thereof.

11. A scale comprising a framework, a scale beam, and a weight pivoted on said framework and connected to said scale beam, said beam and said pivoted weight being so mounted and so connected that planes drawn through the fulcrum point and the center of gravity of each will remain substantially parallel under all conditions.

12. A scale comprising a rotatable member, a cam structure carried by said member, a beam connected to one side of said cam structure, and a weight connected to the other side of said cam structure, said connections being such that movement of the scale out of level will cause the said weight to prevent the beam from assuming a new starting position.

13. A scale comprising a framework, a scale beam fulcrumed thereon, and means connected to said scale beam for exerting resisting moments of forces substantially equal to any moments of forces which tend to affect movement of said beam excepting those exerted by the article being weighed to offer resistance to the movement of said beam away from normal position.

14. A scale comprising a framework, a scale beam fulcrumed thereon, and means connected to said scale beam for exerting resisting moments of forces substantially equal to any moments of forces which tend to affect movement of said scale beam away from its predetermined relative position to said framework excepting those exerted by the article being weighed to offer resistance to the movement of said beam away from its predetermined relative position with respect to said framework.

In testimony whereof I, hereby, affix my signature.

MERVIL HALLEAD.